June 23, 1942.  F. F. UEHLING  2,287,459
MEANS FOR REGULATING VARIABLE CONDITIONS
Filed Aug. 31, 1940   3 Sheets-Sheet 1

INVENTOR
Fritz Frederick Uehling

June 23, 1942.     F. F. UEHLING     2,287,459
MEANS FOR REGULATING VARIABLE CONDITIONS
Filed Aug. 31, 1940     3 Sheets—Sheet 3

INVENTOR
Fritz Frederick Uehling

Patented June 23, 1942

2,287,459

UNITED STATES PATENT OFFICE 2,287,459

MEANS FOR REGULATING VARIABLE CONDITIONS

Fritz Frederick Uehling, Passaic, N. J.

Application August 31, 1940, Serial No. 354,959

3 Claims. (Cl. 172—239)

This invention relates broadly to means for regulating variable conditions, one of the objects being to provide a simple and novel means for influencing magnetic lines of force, said means consisting primarily of a disc rotating in the path of said lines of force to create eddy currents which react therewith to influence their direction and density.

Another object of the invention is to provide a coil, across which an electric potential is induced by means of a changing magnetic flux, with means for creating eddy currents which react with the flux to influence said induced potential.

Still another object is to provide electrical means for creating said eddy currents, with means regulated by said induced potential for controlling the current through said electrical means.

Another object of the invention is to provide means for subjecting the eddy current creating means to the influence of a variable condition, with means regulated by said induced potential for controlling the condition.

Although the novel method of subjecting an induced electromotive force to the influence of eddy currents lends itself to the solution of many control problems without in any way departing from the invention, I have chosen for the purpose of description, to confine the drawings and specifications to means for maintaining the speed of a series wound motor at any desirable fixed magnitude, said specific application embodying all of the fundamental elements of the invention.

Broadly speaking electric motors may be divided into two classes, constant speed and variable speed motors. The first class consists of constant speed motors such as synchronous motors, induction motors etc. which are designed to operate at a constant speed or at an approximately constant speed regardless of changes in the load. Although such motors maintain a constant velocity, they will only operate at the particular velocity for which they are designed. On the other hand variable speed motors, of which the series wound motor is the most extensively used, have the objectionable characteristic in that the speed of the motor decreases as the load is increased with a converse increasing of speed as the load is decreased.

Another object of this invention is therefore to provide means for maintaining the speed of a series wound motor constant regardless of changes in the load, and also the provision of means for changing the constant speed of the motor to any desired magnitude.

In the accompanying drawings, Figure 1 is a diagrammatic view of the regulating system as applied to an alternating current motor.

Figure 1:
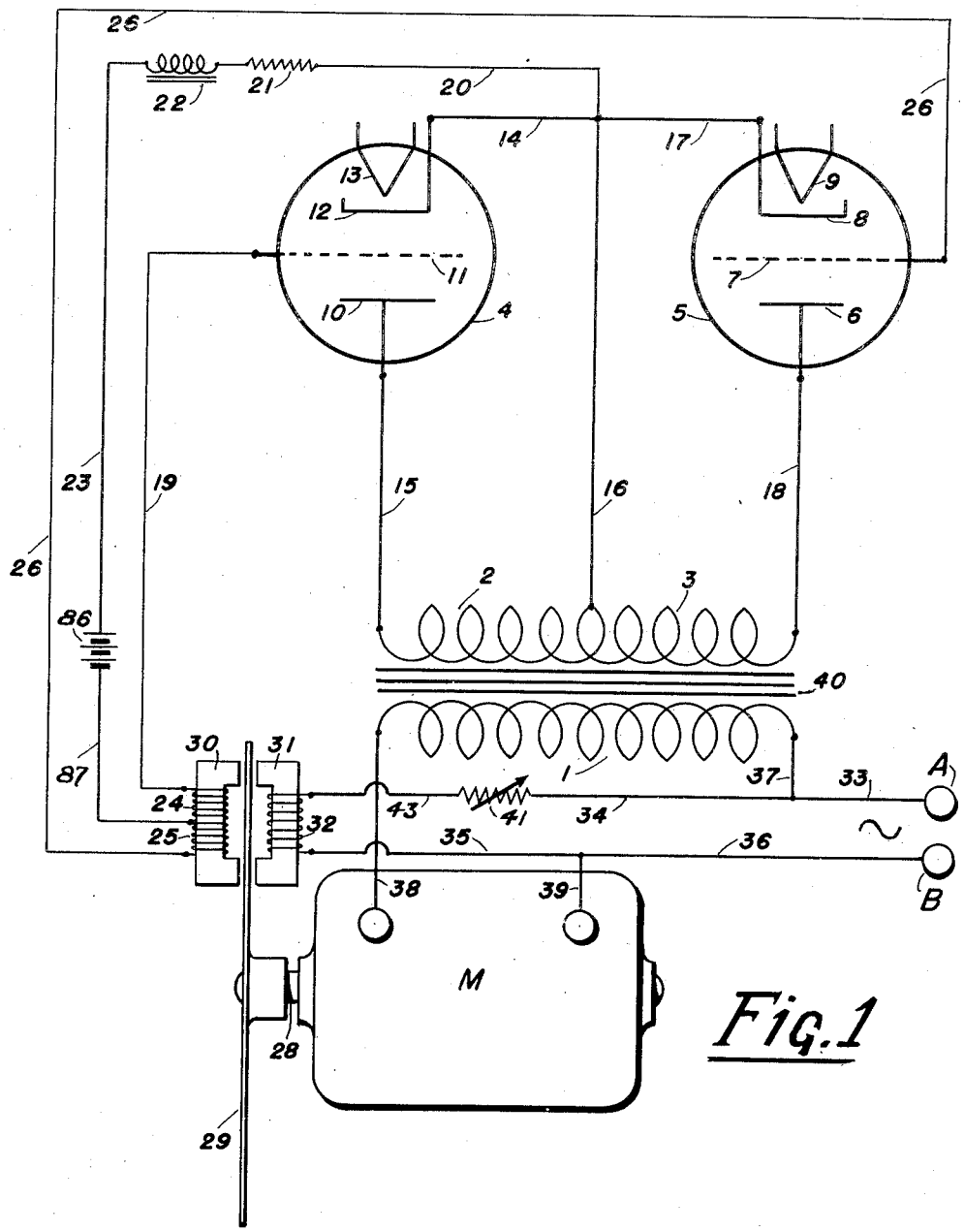
Figure 2:
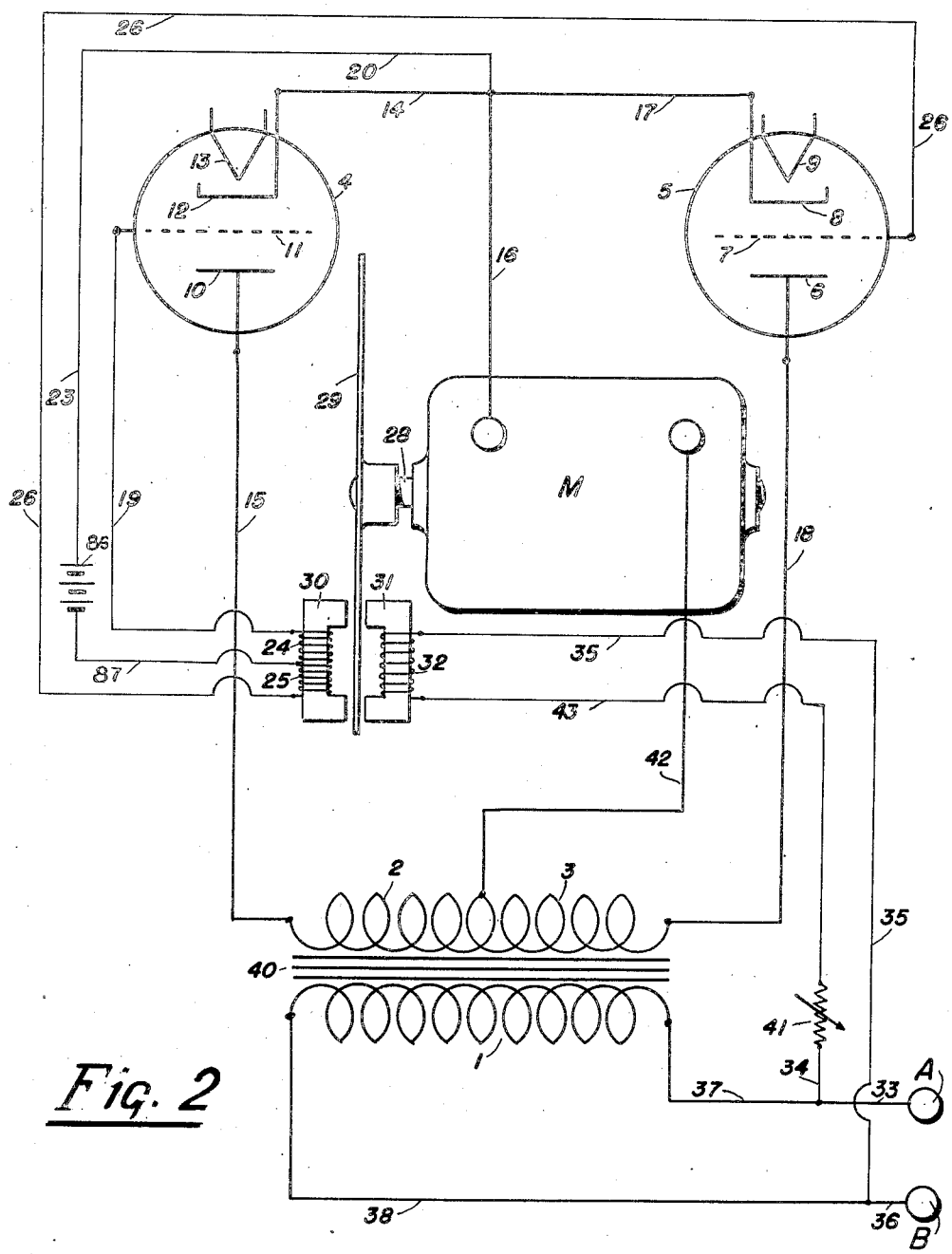
Figure 2 is a diagrammatic view of the system as applied to a direct current motor.
Figure 3:
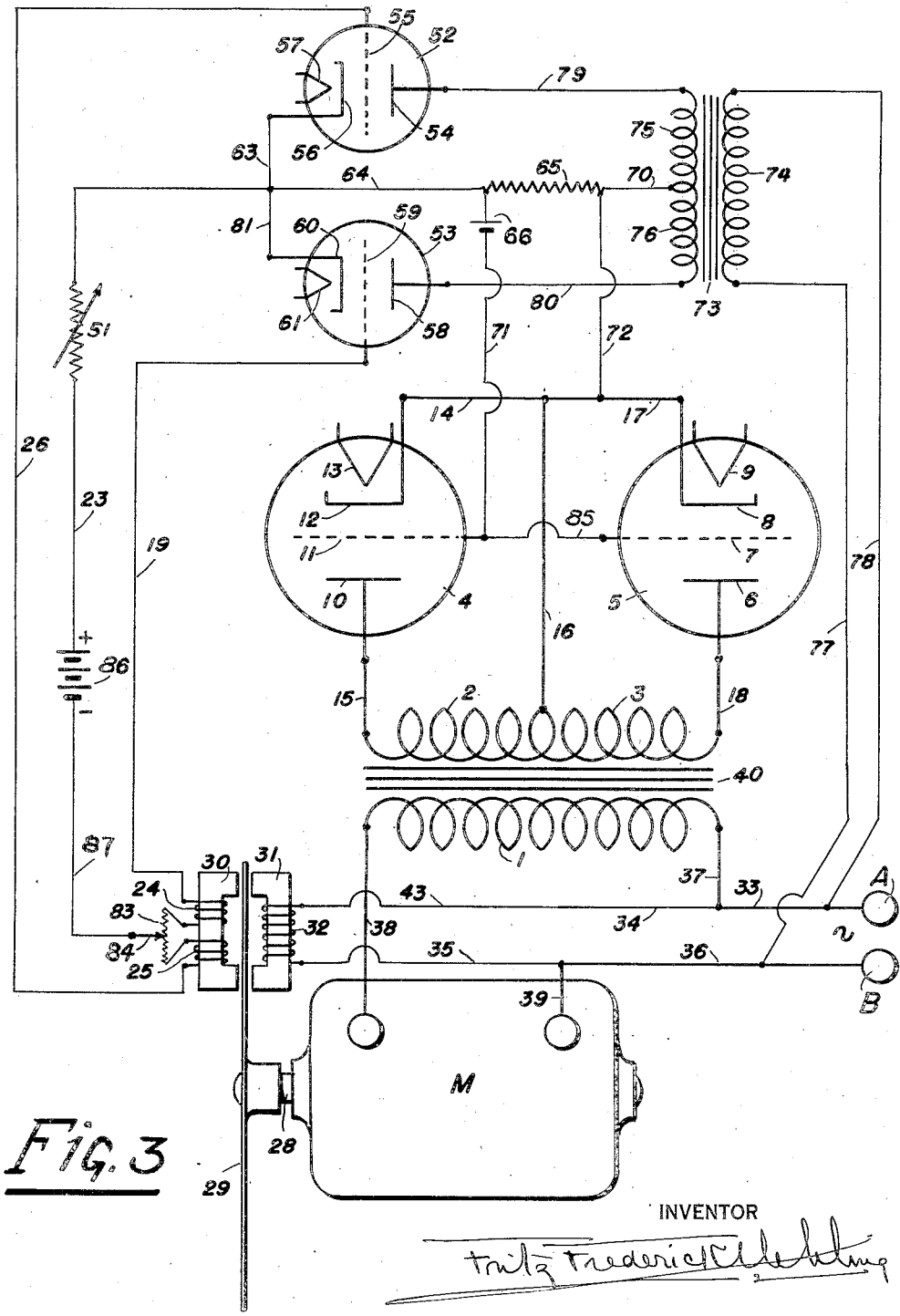
Figure 3 illustrates a modified form of the invention as illustrated in Figure 1.

The novel method of regulation as illustrated in Figures 1, 2 and 3 consists fundamentally of a specially designed transformer, the magnetic flux of which is influenced or dissipated by means of eddy currents created in a disc rotating in the path of the magnetic lines of force of the transformer. The magnetic circuit of the transformer may consist, for example, of two iron cores 30 and 31 with an air gap between them in which gap a disc 29 is rotatably mounted. The primary coil 32 which is wound on the core 31, Figure 1, receives its energy from any source of alternating current A—B through wires 33, 34, 43, 35 and 36. The magnetic flux thus created in the magnetic circuit which consists of said iron cores 30 and 31 and the air gap between them, will induce an electric potential in the coils 24 and 25 which are wound on the core 30. It is obvious that when the disc 29 is rotated, the flux existing between the two iron cores will be cut thereby, thus creating eddy currents in the disc which react with the flux created by coil 32 to reduce the mean flux density in the core 30. By this method the electromotive force induced in the secondary coils 24 and 25 becomes a function of the speed of the disc, the maximum induced voltage existing when the disc is at rest and the minimum induced voltage existing when the disc is rotating at its maximum velocity. As a matter of fact such a transformer and rotating disc may be so designed to practically eliminate all induced voltage in the secondary coils 24 and 25 for any given excitation of the primary coil 32.

In the particular application of the invention as illustrated in Figure 1, the disc 29 is rotated by means of a motor M, the speed of which it is desired to maintain constant. The motor M is a series wound motor the speed of which for any given load is a function of the magnitude of the current passing through it. The motor receives its energy from the source of alternating current A—B through the primary winding 1 of a transformer 40. In other words the circuit which includes the motor starts at the source A—B thence through wires 33 and 37 to said primary winding 1, from the primary winding through wire 38 to the motor and thence through wires 39 and 36 back to the source. The secondary windings 2 and 3 of the transformer 40 are respectively included in the plate circuits of electronic tubes 4 and 5 which tubes consist respectively of plate 10, grid 11 and cathode 12, and plate 6, grid 7 and cathode 8. In other words the circuit which includes the secondary winding 2 starts at the cathode 12 of tube 4, from the cathode through wires 14 and 16 to the winding 2 and thence through wire 15 back to the plate 10 of said tube. Similarly the circuit which includes the secondary winding 3 starts at the cathode 8 of tube 5, from the cathode through wires 17 and 16 to the winding 3 and thence through wire 18 back to the plate 6 of said tube. The respective heaters 13 and 9 of said tubes may be excited by any source of energy not shown. The transformer 40 is so designed that when the circuits through the secondary windings 2 and 3 are open the impedance of the primary winding 1 is sufficient to prevent the operation of motor M.

The induced potential in the secondary coils 24 and 25 of the specially designed transformer already referred to is, in the manner stated, a function of the speed of the disc. These coils are respectively associated with the grids 11 and 7 of the tubes 4 and 5 for the purpose of controlling the plate circuits of said tubes. The coils 24 and 25, Figure 1, are so wound that together they may be considered as a single winding, the center point of which is connected through wires 87, 23, 20 and 14 with the cathode 12 of tube 4, and through wires 87, 23, 20 and 17 with the cathode 8 of tube 5. The ends of the winding, considered in this sense, are connected respectively with grid 7 and grid 11 through wires 26 and 19. In other words referring to the secondary winding as two coils 24 and 25, said coils are respectively included in the grid circuits of tubes 4 and 5.

Although the plate circuits of the tubes 4 and 5 may be respectively controlled in a number of different ways by means of the potential induced in the coils 24 and 25, I have chosen, as an example, to bias the grid of each tube by means of a common battery 86 included in both of the grid circuits as illustrated. The potential of the battery has the proper polarity and is sufficiently high so that by itself it will prevent the firing of both tubes. The voltage of the battery is however opposed by the voltage induced in the coils 24 and 25 and is of such a magnitude that when the disc 29 is at rest the induced potential from said coils at the peak of their respective half cycles will reduce the net applied voltage on the grids sufficiently at that instant to permit the firing of the tubes. A resistance 21 and an inductance 22 or any other means for shifting the phase angle of the current induced in 24 and 25 is provided for the purpose of making the peak of each half wave of the potential induced in the coils 24 and 25 coincide with a point at or near the beginning of each half wave of the current respectively flowing through the plate circuits of the tubes 4 and 5, thus insuring the flow of practically the full half waves of one polarity through the tube 4 and the flow of practically the full half waves of the opposite polarity through tube 5.

To illustrate the manner in which the motor M, Figure 1, is maintained at a constant speed, let us assume that the motor is energized by current from the alternating current source A—B through the circuit which, as already stated, includes the primary winding 1 of the transformer 40. The primary coil 32 of the special transformer 30—31 is simultaneously energized from the same source thus causing an induced voltage in each of the secondary coils 24 and 25. The voltage of battery 86 which is applied to the grids 7 and 11 through wires 19 and 26 respectively is, as already stated, sufficiently high in itself to prevent the firing of the tubes 4 and 5. The negative voltage applied to the grid 7 by the battery is however normally opposed by the induced voltage of coil 25 to such an extent that the net voltage applied to the grid 7 during an instant in each half cycle of one polarity is sufficiently low to permit the firing of tube 5. Similarly the negative voltage applied to the grid 11 by said battery is opposed by the induced voltage of the coil 24 to provide a net voltage on grid 11, during an instant in each half cycle of opposite polarity, sufficiently low to permit the firing of tube 4. It follows therefore that when the motor is connected with the source A—B through the primary winding 1, an electric potential will be induced across the secondary windings 2 and 3 which when the grids 7 and 11 are biased with a voltage sufficiently low in magnitude, will cause half waves of one polarity to flow through the tube 4 and half waves of the opposite polarity to flow through the tube 5. Normally the voltage of battery 86 which is applied to the grid 11 through wire 19 is sufficiently opposed by the induced voltage of coil 24 to permit the firing of tube 4, and similarly the same battery voltage which is applied to the grid 7 through wire 26 is sufficiently opposed by the induced voltage of coil 25 to permit the firing of tube 5. Under these conditions half waves of one polarity will flow through the secondary winding 2 and half waves of the opposite polarity will flow through the secondary winding 3 thus energizing the motor M by means of the alternating current from the source through the primary winding 1. The motor will thus rotate the disc 29 with an increasing velocity thereby creating eddy currents with increasing magnitudes. The eddy currents which are thus induced in the disc as it passes through the space between the two cores 30 and 31, react with the flux of the magnetic circuit which includes the two cores 30 and 31 to decrease the mean density of the flux in the core 30. As the flux density in the core 30 continues to decrease the induced voltage of coils 24 and 25 will obviously also continue to decrease until the opposing voltage of battery 86 dominates sufficiently to prevent the firing of tubes 4 and 5. As soon as the tubes fail to fire there will be no current flowing through the secondary windings 2 and 3 of the transformer 40 thus increasing the impedance of the primary coil 1, correspondingly reducing the speed of the motor, and simultaneously reducing the rate at which the disc 29 cuts the magnetic lines of force as it rotates between the two cores 30 and 31. The slightest reduction in the speed of the motor will however reduce the eddy currents created by the rotating disc, thus in the manner previously stated, causing a higher induced voltage in the secondary coils 24 and 25. As soon as the higher induced voltage in the secondary coils 24 and 25 again opposes the voltage of battery 86 sufficiently to permit the firing of tubes 4 and 5, current will again flow through the secondary coils 2 and 3 of the transformer 40 thus decreasing the impedance of the primary coil 1 and causing a proportional increase in the speed of the motor. The slightest increase in the speed of the motor will however again increase the voltage induced in the coils 24 and 25 to again prevent the firing of tubes 4 and 5. It is obvious therefore that regardless of changes in the load on the motor, this cycle will repeat itself as required to maintain a constant velocity.

It follows from the above that the constant speed at which the motor will operate depends upon the initial magnitude of the voltage induced in the coils 24 and 25 when the disc 29 is at rest. This initially induced voltage in 24 and 25 opposes the battery 86, as previously stated, to reduce the voltage applied to the grids to a point below that required to permit the firing of the tubes thereby causing the motor to operate. The eddy currents created in the rotating disc 29 will however reduce the mean flux in the core 30 thus reducing the voltage induced in 24 and 25 and since the eddy currents in the disc depend upon the velocity of the disc, the speed of the motor will increase only to a point where the net voltage on the grids is sufficiently high to prevent the firing of the tubes, at which speed, in the manner already stated, the motor will be maintained. The constant speed at which the motor will operate therefore depends upon the voltage initially induced in the coils 24 and 25 which initially induced voltage is a function of the constant voltage applied to the primary coil 32. Any means for changing the voltage applied to the coil 32, such as for example, a variable resistance 41, will therefore serve to change the constant speed of the motor to any desired magnitude.

Although the motor illustrated in Figure 1 is an alternating current motor connected in series with the primary winding of a transformer, it is obvious that such a motor may be included in any other grid controlled alternating current circuit without in any way departing from this invention. Furthermore a direct current motor may be similarly controlled when energized by the plate current from tubes 4 and 5. Such a motor M is illustrated in Figure 2 in which the rectified current from both tubes flows through the motor in the same direction and is controlled in the same manner as previously stated by the eddy currents created in the disc 29, the speed of the motor being determined by the voltage applied to the coil 32 said voltage being adjustable by any suitable means such as for example a rheostat 41.

The speed of the motor M as illustrated in Figures 1 and 2 is a function of the current passing through the plate circuits of the tubes 4 and 5, which tubes are respectively controlled by the voltage applied to the grids 11 and 7. It is well known, however, that the magnitude of the voltage required on a grid to prevent the firing of an electronic tube depends on the plate voltage. In other words for every given voltage applied to the cathode and plate, a definite voltage will be required for the grid below which the current will flow through the plate circuit and above which the current through the plate circuit will be prevented. In a series wound motor it is however possible to have transients when there is the slightest sparking between the commutator and the brushes of the motor. As previously stated, the firing of the tube 4 starts at an instant in each half wave of one polarity when the net voltage on the grid 11 resulting from the battery 86 and the opposing voltage of coil 24 reaches a magnitude sufficiently low to cause the firing of the tube at that instant. Similarly the firing of the tube 5 starts at an instant in each half wave of the opposite polarity when the net voltage on the grid 7 resulting from the battery 86 and the opposing voltage of the coil 25 reaches a magnitude sufficiently low to cause the firing of the tube at that instant. It is obvious therefore that any transients in the plate circuits which influence the voltage required on the grids to prevent the firing of the tubes may result in premature firing of the tubes, thus causing erratic regulation. In order to prevent this condition when controlling a circuit involving transients I provide a battery 66, Figure 3, the negative pole of which is connected with the grids 11 and 7 of the tubes 4 and 5 through wire 71 while the positive pole is connected with the cathodes 12 and 8 of said tubes through a resistance 65 and wire 72. The voltage of the battery 66 is sufficient in itself to prevent the firing of the tubes 4 and 5 regardless of transients in the plate circuits of the tubes. This voltage is however opposed by the drop across the resistance 65, direct current through which resistance is provided by two small electronic tubes 52 and 53 consisting respectively of a plate 54, a grid 55 and a cathode 56, and a plate 58, a grid 59 and a cathode 60, the cathode heaters 57 and 61 of said tubes being energized from any source not shown. The plate current of the tubes 52 and 53 is respectively supplied by the secondary coils 75 and 76 of the transformer 73, the primary coil 74 of which is energized from the source A—B through wires 77 and 78. In other words the voltage induced in the secondary winding 75 during the half waves of one polarity will cause current to flow from said winding through wire 70 to the resistance 65 in a given direction, from the resistance through wires 64 and 63 to the tube 52 and thence through wire 79 back to the secondary winding 75. Similarly the voltage induced in the secondary winding 76 during the half waves of the opposite polarity will cause current to flow from said winding through wire 70 to the resistance 65 in the same direction, from the resistance through wires 64 and 81 to the tube 53 and thence through wire 80 back to the secondary winding 76. The resistance 65 is such that when current is flowing through the plate circuits of the tubes 52 and 53, the drop across the resistance will oppose the voltage of battery 66 sufficiently to cause a voltage on the grids 11 and 7 low enough to permit the firing of the tubes 4 and 5 regardless of transients in the plate circuits of said tubes. It thus follows that when the tubes 52 and 53 are firing, the drop across the resistance 65 will oppose the battery 66 sufficiently to permit the firing of tubes 4 and 5, and when the tubes 52 and 53 are not firing, the voltage of battery 66, unopposed by a drop across 65, will prevent the firing of tubes 4 and 5. It follows therefore that the motor M, Figure 3, will be deenergized or energized, depending upon whether or not the tubes 52 and 53 are firing. These tubes are however controlled by the voltage applied to the grids 55 and 59, the magnitude of which, in the manner previously described, depends upon the fixed voltage of battery 86 and the opposing induced voltage of the secondary coils 24 and 25, said induced voltage depending upon the velocity at which the disc 29 is being rotated by the motor.

To further illustrate the manner in which the speed of motor M, Figure 3, is regulated, let us assume that the disc 29 is at rest. Under this condition the electromotive force induced in coils 24 and 25 will, in the manner stated, oppose the battery 86 sufficiently to permit the firing of tubes 52 and 53. The firing of these tubes will cause a unidirectional flow of current through the resistance 65 with a resulting drop across said resistance of the proper polarity and magnitude to sufficiently oppose the battery 66 to permit the firing of tubes 4 and 5. The current through the tubes 4 and 5 as caused by the induced voltage in the windings 2 and 3 of the transformer 40 will thus reduce the impedance of the winding 1 to permit the operation of motor M. Energizing the motor will cause the disc 29 to rotate at an increasing velocity thus, in the manner previously stated, causing a decreasing induced voltage in the coils 24 and 25. This induced voltage will continue to decrease as the speed of the disc continues to increase until the voltage of battery 86 dominates sufficiently to prevent the firing of tubes 52 and 53. As soon as the tubes 52 and 53 cease firing there will be no current flowing through the resistance 65 and the drop across this resistance which normally opposes the battery 66 will be reduced to zero thus permitting the full voltage of the battery to prevent the firing of the tubes 4 and 5. The failure of current to flow through the tubes 4 and 5 from the secondary windings 2 and 3 of transformer 40 will immediately increase the impedance of the primary winding, thus reducing the speed of the motor. The slightest reduction in the speed of the disc 29 will however decrease the eddy currents of the disc, thus in the manner stated, causing a higher induced voltage in the coils 24 and 25 to again sufficiently oppose the battery 86 to permit the firing of tubes 52 and 53. The firing of tubes 52 and 53 will again cause a drop across the resistance 65 which sufficiently opposes the battery 66 to again cause the firing of tubes 4 and 5 thereby again decreasing the impedance of the primary winding 1 to increase the speed of the motor. This cycle will obviously repeat itself as required to maintain the motor M, or the disc 29 which is driven thereby, at a constant velocity.

As previously stated, the constant speed at which the motor will function depends upon the magnitude of the voltage induced in coils 24 and 25 when the disc 29 is at rest. This may be adjusted by means of an adjustable resistance 41 as in Figures 1 and 2, in which case the resistance 41 determines the constant voltage applied to the coil 32. The constant speed at which the motor, Figure 3, will operate also depends upon the magnitude of the net voltage applied to the grids of tubes 52 and 53 when the disc 29 is at rest. It is obvious therefore that the constant speed of the motor may also be adjusted by means of a variable resistance in series with both of the coils 24 and 25. Such a resistance 51 is shown in Figure 3 and is included in both the grid circuit of tube 52 and the grid circuit of tube 53. It may also be desirable to include a divider consisting of a resistance 83 and a slider 84 which permits the balancing of the voltage induced in coils 24 and 25 thus assuring the simultaneous firing of tubes 52 and 53.

I claim:

1. In a device of the class described, the combination with a transformer consisting of two iron cores separated by air gaps and a coil wound on each of said cores, of a metallic disc rotatably located in said air gaps, a source of current for supplying energy to one of the coils to create magnetic flux in a magnetic circuit which includes both cores, the air gaps and the disc, and which induces electrical energy in the other coil, and means controlled by said induced energy for rotating the disc to create eddy currents which react with the flux to influence said induced energy.

2. In a device of the class described, the combination with a rotatably mounted circular, imperforate, non-magnetic metal disc, of a coil located on one side of the disc, a second coil located on the other side of the disc, means for energizing the first coil to create magnetic lines of force which pass through the disc in all of its positions to induce a potential in the second coil, and means for rotating the disc to create eddy currents therein which react with said lines of force to influence said induced potential.

3. In a device of the class described, the combination with a transformer including two coils each wound on a separate iron core with an air gap between the cores, of an imperforate disc of non-magnetic electrically conductive material rotatably mounted to continuously move in the gap between the cores, a source of current for energizing one of the coils to create magnetic lines of force which pass through the disc in all of its positions to energize the other coil, and means for rotating the disc to create eddy currents therein which react with the energy of said one coil to influence the energy induced in the other coil.

FRITZ FREDERICK UEHLING.